United States Patent [19]

Nittel et al.

[11] 4,419,441

[45] Dec. 6, 1983

[54] DISPERSION PROCESS

[75] Inventors: Fritz Nittel, Leverkusen; Helmut Mäder, Odenthal, both of Fed. Rep. of Germany

[73] Assignee: Agfa-Gevaert Aktiengesellschaft, Leverkusen-Bayerwerk, Fed. Rep. of Germany

[21] Appl. No.: 482,280

[22] Filed: Apr. 11, 1983

Related U.S. Application Data

[63] Continuation of Ser. No. 278,603, Jun. 29, 1981, abandoned.

[30] Foreign Application Priority Data

Jul. 1, 1980 [DE] Fed. Rep. of Germany ....... 3024881

[51] Int. Cl.$^3$ ................................................ G03C 1/40
[52] U.S. Cl. .................................. 430/377; 430/512; 430/546; 430/631
[58] Field of Search ................. 430/377, 546, 631, 512

[56] References Cited

U.S. PATENT DOCUMENTS

T969,005  4/1978  Tanaka et al. .
2,322,027  6/1943  Jelley et al. ......................... 430/546
3,271,152  9/1966  Hanson ............................... 430/546
3,676,142  7/1972  Carpentier et al. ................. 430/359
4,003,748  1/1977  Langen et al. ....................... 430/546

*Primary Examiner*—J. Travis Brown
*Attorney, Agent, or Firm*—Connolly and Hutz

[57] ABSTRACT

Hydrophobic substances, particularly hydrophobic additive for photographic layers such as couplers may be dispersed in an aqueous medium in a two—or more—stage process using an oil-former. In a main dispersion stage the total quantity of the hydrophobic substance is dispersed in the aqueous medium without oil-former or with only part of the total quantity of oil-former. The residual portion of oil-former is dispersed in the aqueous medium without hydrophobic substance in at least one further dispersion stage preceding or following the main dispersion stage. The oil-former used is preferably a compound or a mixture of compounds selected from triaryl phosphates, dialkyl phthalates, monoesters of α-substituted succinic acid or of hydrogenated phthalic acids and aliphatic or cycloaliphatic alcohols of at least 10 carbon atoms. The process yields dispersions of improved stability of digestion.

9 Claims, No Drawings

DISPERSION PROCESS

CROSS-REFERENCE TO RELATED APPLICATIONS

This is a continuation of U.S. patent application Ser. No. 278,603, filed June 29, 1981 by Fritz Nittel and Helmut Mader entitled Dispersion Process, now abandoned.

This invention relates to the preparation of a dispersion of a hydrophobic substance in an aqueous medium using a multi-stage dispersion process.

It is known to dissolve hydrophobic substances, such as color couplers, UV absorbents, stabilizers and the like, in a high boiling solvent (oil-former) and a low boiling auxiliary solvent and then to disperse it in the form of such a solution in an aqueous medium, e.g. an aqueous solution of a hydrophilic binder. After removal of the low boiling auxiliary solvent, the hydrophobic substance is present in the aqueous medium in the form of small particles or droplets of oil-former containing the hydrophobic substance. The process was first described in U.S. Pat. No. 2,322,027.

This method of dispersing hydrophobic substances has persisted substantially in this form to the present day, although various other types of substances have been proposed for use as oil-formers.

The stability of the dispersions obtained by this method of dispersing hydrophobic substances in an aqueous medium depends on the nature of the oil-former, the particular operating conditions employed and not least the tendency to crystallization of the hydrophobic substances which are to be dispersed. It has been found that when the method is employed on a large scale, the dispersions no longer have the required stability, especially if they are prepared at high production rates. It is evident that many of these dispersions are metastable systems in which the dispersed hydrophobic substances are present in the form of saturated or even super-saturated solutions in oil-former and therefore tend to recrystallize more or less rapidly on storage (4° C.) or under digestion conditions (40° C.). Separation of the dispersed hydrophobic substances by crystallization may in many cases be observed after only a short time and if, for example, the dispersions are used in photographic materials, this crystallization causes marked deterioration of the sensitometric properties, such as sensitivity and maximum color density.

Although the causes of this phenomenon have not been completely clarified, it is presumed that they are to be found mainly in that stage of the process in which the low boiling auxiliary solvent is removed. If this is not carried out under careful conditions, e.g. in a thin layer evaporator but in apparatus such as a falling stream vacuum evaporator using a high rate of ballast steam injection for the purpose of obtaining a high rate of throughput, it would appear that the abrupt removal of the low boiling auxiliary solvent causes the breaking up of previously formed droplets of hydrophobic substance, oil-former and low boiling solvent so that traces of hydrophobic substance enter the surrounding aqueous phase and form crystal nuclei and, assisted by the albeit brief presence of the low boiling solvent and possibly also by the solubilizing action of wetting agents or dispersing agents, crystal growth sets in with varying degrees of rapidity. One particularly disadvantageous factor is that relatively high concentrations of wetting agents and dispersing agents (from ca. 5 to 10%, based on the oil phase) are evidently necessary for obtaining finely divided dispersions no longer tending to agglomeration.

It has also been attempted to counteract the high tendency to crystallization of the dispersing substances and the consequent instability of the dispersions by using larger quantities of oil-former or particular types of oil-former. This measure, however, frequently has an undesirable effect on the reactivity of the dispersed substances, e.g. the coupling kinetics of an emulsified coupler. In that case, it may be difficult correctly to adjust the reactivities of several substances in a layer to each other, apart from the fact that an increase in the quantity of oil-former increases the quantity of substances in a layer or necessitates an increase in the thickness of the layer.

An object underlying the present invention is to produce stable dispersions of hydrophobic substances in an aqueous medium at a high output rate.

The present invention relates to a process for the preparation of a dispersion of a hydrophobic substance in an aqueous medium using an oil-former, in which in a main dispersion stage the total quantity of the hydrophobic substance is dispersed in the aqueous medium without oil-former or together with only part of the total quantity of oil-former, and in which in at least one further dispersion stage preceding or following the main dispersion stage the residual portion of the total quantity of oil-former is dispersed in the aqueous medium without the hydrophobic substance to be dispersed.

It is therefore a characterizing feature of the process according to the present invention that it comprises a plurality of dispersion stages, i.e. at least two stages, viz a main dispersion stage in which the hydrophobic substance is dispersed and, either preceding or following this stage, at lest one further dispersion stage in which substantially only oil-former is dispersed. The process according to the present invention thus comprises a total of at least two dispersion stages, one of which is the main stage and the second either a predispersion stage or a post-dispersion stage. Although the main dispersion stage may be both preceded and followed by pre-dispersion and post-dispersion stages, respectively, this is less preferred.

In the main dispersion stage, the total quantity of hydrophobic substance to be dispersed is dispersed in the aqueous medium in known manner, generally by dissolving the hydrophobic substance in a low-boiling solvent (auxiliary solvent) which is substantially immiscible with water and then dispersing the resulting solution in the aqueous medium. Ethyl acetate and diethyl carbonate are useful solvents for this purpose, although the auxiliary solvent may also be a mixture of liquids optionally also containing minor quantities, e.g. up to 10%, of a low-boiling, water-miscible solvent, e.g. ethanol or acetone. As a general rule, however, it may be said that the auxiliary solvent is on the whole immiscible with water and has a low boiling point, e.g. below 100° C. under standard pressure. In addition to the hydrophobic substance and the auxiliary solvent, the solution which is mixed with the aqueous medium in the main dispersion stage may also contain an oil-former, as is common in the conventional dispersion processes. According to the present invention, the quantity of oil-former used in the main dispersion stage is e.g. up to 1 part by weight for 1 part by weight of the hydrophobic substance to be dispersed. Simultaneously, the amount of oil-former used in the main dispersion stage may be up to about 4/5th of the total amount of oil-former used in the process of the invention.

In some cases, however, it may be of advantage not at all to use an oil-former in the main dispersion stage. This may be the case, when the combination of oil-former and hydrophobic substance, such as color complex yields a super-saturated solution which is sensitive to mechanical stress as it may be expected e.g. by gear-wheel pumps in modern coating machines. In absence of oil-former in the main dispersion stage the complex is present in the form of droplets of an undercooled melt which are less sensitive to mechanical stress.

The oil-formers generally have boiling points above 180° C. under standard pressure and a good dissolving power for the hydrophobic substance to be dispersed. The oil-formers may be the usual hydrophobic oil-formers or oil-formers which due to the presence of hydrophobic groups such as hydroxyl or carboxy groups have less hydrophobic character and which for this reason are considered as "hydrophobic" oil-formers in the context of this specification. Examples of hydrophobic oil-formers include esters of glutaric acid, adipic acid, phthalic acid, sebacic acid, succinic acid, maleic acid, fumaric acid, isophthalic acid, terephthalic acid and phosphoric acid, esters of glycerol, and paraffin and fluorinated paraffin because these compounds are chemically stable, readily accessible and easy to handle and have no deleterious effect on light-sensitive materials when the dispersions are used for photographic purposes. As hydrophobic oil-formers, the following are particularly preferred for the purposes of the present invention: triaryl phosphate such as tricresyl phosphate, triphenyl phosphate, dialkyl phthalates such as dibutyl phthalate, di-n-hexyl phthalate, di-n-octyl phthalate, di-n-nonylphthalate, di-n-dodecyl phthalate, di-2-ethylhexyl phthalate, glycerol tributyrate, glycerol tripropionate, dioctyl sebacate, paraffin and fluorinated paraffin. Oil-formers of reduced hydrophobic character ("hydrophobic" oil-formers) such as monoesters of succinic acid having in α-position an aliphatic residue of at least 8 carbon atoms or monoesters of phthalic acids or hydrogenated phthalic acids have also proved to be particularly advantageous. Compounds of this type have been described in U.S. Pat. No. 3,689,271. When such compounds are used in the pre-dispersion stage, for example, the quantity of dispersing agent may be considerably reduced below that normally required. In the post-dispersion stage, these compounds are also found to be superior to conventional hydrophobic oil-formers. Hydrophobic oil-formers useful in the process of this invention are also aliphatic or cycloaliphatic (cycloaliphatic) alcohols preferably having at least 10 carbon atoms provided they are not or only slightly volatile, with water vapor. Preferred examples of such compounds are hydroxymethyl derivatives of tricyclo [5.2.1.0$^{2,6}$]decane. Examples of the preferred oil-formers are indicated below:

(1)

(2)

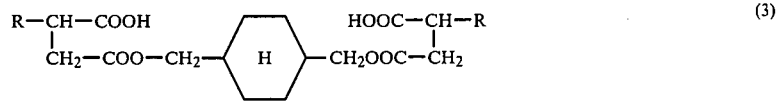

(3)

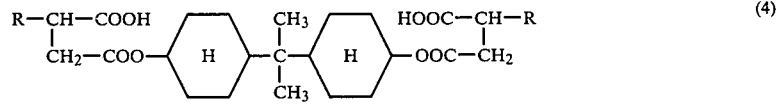

(4)

(5)

(6)

(7)

-continued
 (8)
 (9)
 (10)
 (11)
 (12)
 (13)
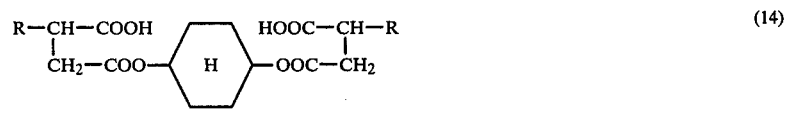 (14)
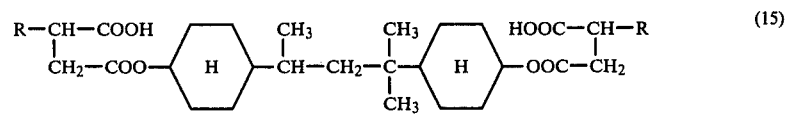 (15)
 (16)
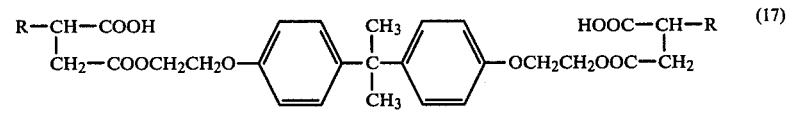 (17)
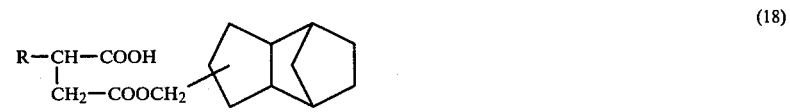 (18)
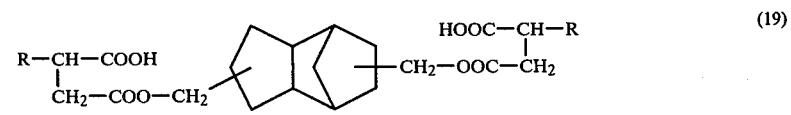 (19)
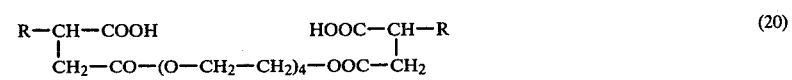 (20)

-continued

(21) R—CH—COOH  HOOC—CH—R
     |                    |
     CH₂—CO—(O—CH₂—CH₂)₈—OOC—CH₂

(22) [tricyclic structure]—CH₂OH

(23) HO—CH₂—[tricyclic structure]—CH₂OH

(24) R—CH—COOH
     |
     CH₂—COO—[tricyclic structure]

(25) H₃C—[cyclohexane, H]—COOH
                          COOCH₂—[tricyclic structure]

(26) R—CH—COOH
     |
     CH₂—COOCH₂—[tricyclic structure]

(27) [cyclohexane, H]—COOH
                     COOCH₂—[tricyclic structure]

(28) R—CH—COOH                    CH₂OOC—CH₂
     |                                    |
     CH₂—COOCH₂—[tricyclic structure]    HOOC—CH—R

(29) [cyclohexane, H]—COOH             CH₂OOC—[cyclohexane, H]
                     COOCH₂—[tricyclic structure]    HOOC

(30) R—CH—COOH
     |
     CH₂—COOCH₂—[tricyclic structure]—CH₂OH
     mixture of isomer

(31) [tricyclic structure]—COOR¹

(32) R¹OOC—[tricyclic structure]—COOR¹

(33) R—CH—COOH                        CH₂—NHOC—CH₂
     |                                          |
     CH—CONH—CH₂—[tricyclic structure]—         HOOC—CH—R

(34) CH₃—(CH₂)₁₀₋₁₂—CH₂OH
     mixture of homologs

(35) CH₃—(CH₂)₁₂—CH₂—OH
     myristyl alcohol

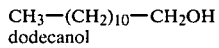
CH₃—(CH₂)₁₀—CH₂OH  (36)
dodecanol

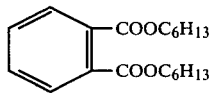   (37)

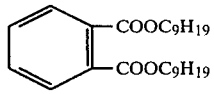   (38)

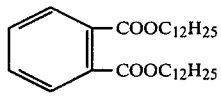   (39)

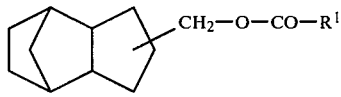   (40)

In the above formulae 1 to 21, 24, 26, 28, 30 and 33, the symbol R represents a relatively long aliphatic residue having at least 8 carbon atoms, preferably one of the following monounsaturated aliphatic groups, $C_{12}H_{23}$, $C_{15}H_{29}$ or $C_{18}H_{35}$, the formation of which may be explained by the multiple addition of propylene. In the formulae 31, 32 and 40 $R^1$ represents an aliphatic residue of 8 to 18 carbon atoms or a benzyl group.

The oil-formers used are not necessarily single substances, but may be mixtures of substances of the several types described above, e.g. mixtures of hydrophobic oil-formers with aliphatic or cycloaliphatic alcohols and/or with monoesters of α-substituted succinic acids or of hydrogenated phthalic acids, or mixtures of monoesters of α-substituted succinic acids of hydrogenated phthalic acids with aliphatic or cycloaliphatic alcohols (without hydrophobic oil-formers).

Where oil-formers are used in the main dispersion stage according to the present invention, they by no means amount to the total quantity of oil-former used in the process according to the present invention, but only to a part thereof, e.g. up to 80% by weight of the total amount of oil-former. The remainder, or in same cases the total quantity of oil-former, is used according to the present invention in a pre-dispersion stage or a post-dispersion stage or is distributed between these two stages. The pre-dispersion and post-dispersion stages according to the present invention are characterized in that only oil-formers are dispersed in the aqueous medium in these stages and not the hydrophobic substance to be dispersed. The oil-former used in the pre-dispersion or post-dispersion stage need not necessarily be identical in its nature or composition to that used in the main dispersion stage, but may be varied according to requirements. For example, the succinic acid monoesters, formulae of which are shown above, have a slight and emulsifying action so that a proportion of the wetting agents and dispersing agents otherwise required may be dispensed with. This may be particularly advantageous if, for example, the dispersion is to be used for the preparation of photographic layers, since high concentrations of wetting agents frequently have an adverse effect on the formation of layers from photographic casting solutions. In addition, by virtue of the more hydrophilic character thereof, the compounds mentioned above have an advantageous effect on chromogenic development using hydrophilic developer substances, such as N-butyl-N-ω-sulfobutyl-p-phenylene diamine. Furthermore, when used in the after dispersion stage, these compounds are capable of binding the crystal nuclei of the substance to be dispersed, which have been formed in the aqueous phase in the main dispersion stage, thereby rendering these nuclei harmless. In all these properties, the hydrophilic oil-formers, particularly the monoesters of α-substituted succinic acids, are superior to the hydrophobic types of oil-formers conventionally used.

It is also advantageous to use an auxiliary solvent in the pre-dispersion and post-dispersion stage in order to obtain very fine dispersion of the oil-former in the aqueous medium.

The process according to the present invention is eminently suitable for preparing dispersions of hydrophobic substances in an aqueous medium, particularly if the substances have a high tendency to crystallization. Example of such hydrophobic substances include: the various types of hydrophobic couplers (4-equivalent couplers, 2-equivalent couplers, DIR couplers, masking couplers, white couplers, competing couplers), dyes and other color providing compounds, e.g. for the dye diffusion transfer process, UV absorbents, stabilizers and other photographic additives. The present invention is by no means limited to the field of photographic chemistry, but is also suitable for other fields of technology, e.g. wherever finely divided stable dispersions in an aqueous medium are to be prepared from chemically reactive hydrophobic substances, particularly if these substances have a high tendency to crystallization.

The aqueous medium is the simplest case water, to which hydrophilic colloidal binders, such as gelatine, may be added to improve the stability of the dispersions. Gelatine may also be partly or completely replaced by other natural, synthetic or semi-synthetic binders, e.g. by derivatives of alginic acid or cellulose, by polyvinyl alcohol, polyacrylates, partially saponified polyvinyl acetate or polyvinyl pyrrolidine. The various solutions prepared for the pre-dispersion, main dispersion or post-dispersion stage are then dispersed one after another in this aqueous medium, e.g. in an aqueous gelatine solution. A considerable quantity of wetting agents or dispersing agents, for example from 5 to 10%, based on the oil phase to be dispersed, is normally added at this stage in order to produce stable dispersions no longer tending to agglomerate. If the succinic acid monoesters, formulae of which are shown, are used, particularly if they are used in the pre-dispersion stage, the quantity of wetting agent or dispersing agent may frequently be considerably reduced, e.g. to 1/5th or ⅛th of the quantity conventionally employed.

It has been mentioned above that oil-formers are added to the aqueous medium during the pre-dispersion or post-dispersion stage without the hydrophobic substance to be dispersed. It is clear from this that the hydrophobic substance is a chemically reactive substance which is different from the oil-former used. The "hydrophobic substance" is that substance which is added to the aqueous medium only in the main dispersion stage of the process according to the present invention. This means that it is not added to the aqueous medium either in the pre-dispersion stage or in the post-dispersion stage. This does not exclude the possibility that other hydrophobic substances also different from the oil-former are dispersed in the aqueous medium, for example in the post-dispersion stage according to the present invention. These other hydrophobic substances may be additives for the photographic layer, but they must not obstruct the function of the oil-former according to the present invention in the post-dispersion stage. Examples of such other hydrophobic substances include UV absorbents or white couplers which may be present in the dispersion prepared according to the present invention in addition to a coupler or any other hydrophobic substance introduced into the aqueous medium during the main dispersion stage.

1. Preparation of the dispersion (general method)

1.1. Two-stage inflow using pre-dispersed oil-formers
The following are dispersed successively in 1 l of a 10% aqueous gelatine solution containing 20 ml of a 10% aqueous solution of di-sec.—butyl naphthalene sulfonic acid-sodium salt (dispersing agent) with vigorous stirring:

1.1.1. Predispersion (PRE-D) from 5 to 200 g of oil-former, e.g. one or more of the substances corresponding to formulae 1 to 39 and from 5 to 200 g of auxiliary solvent (e.g. ethyl acetate or diethyl carbonate). After-stirring time 5 minutes.

1.1.2. Main dispersion (MAIN-D) 100 g of hydrophobic substance, e.g. coupler from 0 to 100 g of oil-former from 100 to 200 g of auxiliary solvent. After-stirring time 5 minutes. The mixture is subsequently put through a high pressure homogenizor (e.g. of manufacturers Knollenberg or Sonic).

1.2. Two-stage inflow using post-dispersed oil-formers. The following are dispersed successively in 1 l of a 10% gelatine solution:

1.2.1. Main dispersion (MAIN-D) 100 g of hydrophobic substance from 100 to 200 g of auxiliary solvent from 0 to 100 g of oil-former After-stirring time 5 minutes.

1.2.2. Post-dispersion (POST-D) from 5 to 200 g of oil-former from 5 to 200 g of auxiliary solvent. After-stirring time 5 minutes. Subsequently as at 1.1.

1.3. Three-stage inflow. The following are dispersed successively in 1 l of a 10% gelatine solution:

1.3.1. PRE-D as at 1.1.1.
1.3.2. MAIN-D as at 1.1.2. or 1.2.1.
1.3.3. POST-D as at 1.2.2.

Other dispersing agents and auxiliary solvents may also be used.

2. Examples.

Dispersions of various hydrophobic substances were prepared by the method according to the present invention and the stability thereof to digestion at 40° C. was determined. For comparison, the stability of dispersions prepared by conventional methods was also determined. Diethyl carbonate was used as auxiliary solvent. The dispersing agent and the hydrophobic substance to be dispersed are indicated separately in each case. They are entered into the following Tables.

2.1. Example series 1.
Cyan coupler of the formula

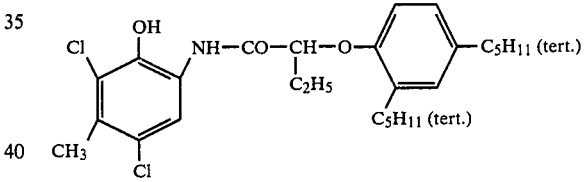

The dispersing agent is the sodium salt of di-sec-butyl-naphthalene sulfonic acid.

TABLE 1

| Experiment (Method) | PRE-D oil-former | MAIN-D 100 g coupler + oil-former | POST-D oil-former | Stability to digestion at 40° C. [days] |
|---|---|---|---|---|
| 2.1.1. | — | — | — | (approx. 30 min) |
| 2. | — | + 100 g TCP | — | (12 hours) |
| 3. (1.2.) | — | — | 100 g TCP | 2 |
| 4. (1.2.) | — | — | 100 g DBP | 1 |
| 5. (1.2.) | — | — | 100 g Comp. 3 | 4 |
| 6. (1.2.) | — | — | 100 g Comp. 4 | 6 |
| 7. (1.2.) | — | — | 100 g Comp. 9 | 5 |
| 8. (1.2.) | — | — | 100 g Comp. 14 | 6 |
| 9. (1.2.) | — | — | 100 g Comp. 15 | 7 |
| 10. (1.2.) | — | + 50 g TCP | 50 g Comp. 4 | 8 |
| 11. (1.2.) | — | + 50 g TCP | 50 g TCP | 3 |
| 12. (1.2.) | — | + 50 g TCP | 100 g Comp. 4 | 12 |
| 13. (1.1.) | 100 g Comp. 4 | — | — | 5 |
| 14. (1.3.) | 20 g Comp. 4 | + 50 g TCP | 50 g Comp. 4 | 11 |
| 15. (1.3.) | 20 g Comp. 14 | — | 80 g Comp. 15 | 13 |

The abbreviations used in this and the following Tables have the following meaning: TCP=tricresyl phosphate, DBP=dibutyl phthalate. Compounds 3, 4, 9, 14 and 15 correspond to the formulae of the same numbering (pages 7 and 8) wherein R represents the group $C_{15}H_{29}$ in compounds 3, 4, 14 and 15 and the group $C_{18}H_{35}$ in compound 9.

2.2. Example series 2.

Cyan coupler as at 2.1.

The dispersing agent is the sodium salt of dodecyl benzene sulfonic acid.

TABLE 2

| Experiment (Method) | PRE-D oil-former | MAIN-D 100 g coupler + oil-former | POST-D oil-former | Stability to digestion at 40° C. [days] |
|---|---|---|---|---|
| 2.2.1. | — | — | — | (0) |
| 2.2.2. | — | +100 g TCP | — | (3 hours) |
| 3. (1.2.) | — | — | 100 g TCP | 1,5 |
| 4. (1.2.) | — | — | 100 g Comp. 4 | 4 |
| 5. (1.2.) | — | +50 g TCP | 50 g TCP | 2 |
| 6. (1.3.) | 20 g Comp. 4 | +30 g TCP | 50 g Comp. 4 | 8 |
| 7. | — | +100 g Comp. 4 | — | (6 hours) |

2.3 Example series 3

Yellow coupler of the formula

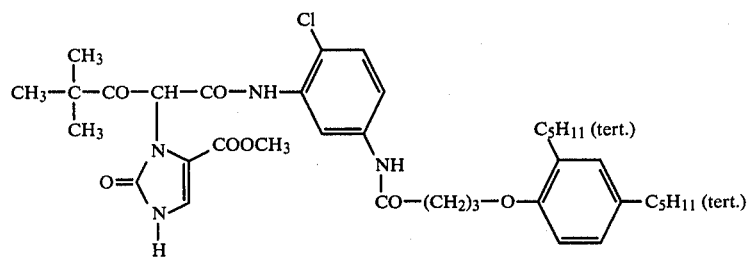

The dispersing agent is the sodium salt of di-sec-butyl-napthalene sulfonic acid.

TABLE 3

| Experiment (Method) | PRE-D oil-former | MAIN-D 100 g coupler + oil-former | POST-D oil-former | Stability to digestion at 40° C. [days] |
|---|---|---|---|---|
| 2.3.1. | — | — | — | (1 hour) |
| 2.3.2. | — | +100 g TCP | — | (10 hours) |
| 3. (1.2.) | — | — | 100 g TCP | 1 |
| 4. (1.2.) | — | — | 100 g Comp. 4 | 2,5 |
| 5. (1.2.) | — | +50 g TCP | 50 g Comp. 4 | 4 |
| 6. (1.1.) | 90 g Comp. 4 | +30 g TCP | — | 5 |
| 2.3.7. | — | +75 g Comp. 22 +75 g Comp. 38 | — | 1,5 |
| 2.3.8. (1.1.) | +25 g Comp. 22 +25 g Comp. 38 | +50 g Comp. 22 +50 g Comp. 38 | — | 7 |
| 2.3.9. | — | +50 g Comp. 27 +100 g Comp. 34 | — | 1 |
| 2.3.10. (1.1.) | +17 g Comp. 27 +33 g Comp. 34 | +34 g Comp. 27 +66 g Comp. 38 | — | 5 |
| 2.3.11. | — | +75 g Comp. 23 +75 g Comp. 34 | — | 1,5 |
| 2.3.12. (1.1.) | +25 g Comp. 23 +25 g Comp. 34 | +50 g Comp. 23 +50 g Comp. 34 | — | 8 |

We claim:

1. A dispersion process of preparing a stable dispersion of a hydrophobic substance in an aqueous medium using an oil former, comprising a plurality of dispersion steps which comprises dispersing in a main dispersion step the total quantity of said hydrophobic substance together with from 0 to about 80% of the total amount of oil former in the aqueous medium and additionally in at least one additional dispersion step which precedes or follows said main dispersion step, dispersing from about 20 to 100% of the total amount of oil former, in the absence of dispersing of said hydrophobic substance, in said aqueous medium, so as to provide from said combined main and additional dispersion steps said stable dispersion of said hydrophobic substance in said aqueous medium.

2. Process as claimed in claim 1 in which the oil-former is a compound or a mixture of compounds selected from the group consisting of triaryl phosphates, dialkyl phthalates, monoesters of succinic acid having in α-position an aliphatic residue of at least 8 carbon atoms, monoesters of hydrogenated phthalic acids, and aliphatic or cycloaliphatic alcohols containing at least 10 carbon atoms.

3. Process as claimed in claim 2, in which a hydroxy methyl derivative of tricyclo[5.2.1.0$^{2.6}$]-decane is used as oil-former.

4. Process as claimed in claim 1 in which the same oil former is used in said main dispersion step and in at least one of said additional dispersion steps.

5. Process as claimed in claim 1 in which the oil-former used in at least one of said additional dispersion stages is different from the oil-former used in the main dispersion stage.

6. Process as claimed in claim 1 in which in the main dispersion stage a compound selected from the group consisting of triaryl phosphates and dialkyl phthalates is used as oil-former.

7. Process as claimed in claim 1 in which in at least one of said additional dispersion steps a monoester of succinic acid having in α-position an aliphatic residue of at least 8 carbon atoms is used as oil-former.

8. Process as claimed in claim 1 in which in at least one of said main dispersion step and said further dispersion steps a mixture of at least two of a first, a second and a third compound is used as oil-former, the first compound being selected from the group consisting of triaryl phosphates and dialkyl phthalates, the second compound being selected from the group consisting of monoesters of succinic acid having in α-position an aliphatic residue of at least 8 carbon atoms and monoesters of hydrogenated phthalic acids and the third compound being selected from the group consisting of aliphatic or cycloaliphatic alcohols of at least 10 carbon atoms.

9. Process as claimed in claim 1 in which the hydrophobic substance is a color coupler.

* * * * *